United States Patent [19]

Rovner et al.

[11] Patent Number: 5,426,984
[45] Date of Patent: Jun. 27, 1995

[54] MAGNETIC FLOWMETER WITH EMPTY PIPE DETECTOR

[75] Inventors: Bruce D. Rovner, Eden Prairie; Thomas P. Coursolle, St. Paul, both of Minn.

[73] Assignee: Rosemount Inc., Eden Prairie, Minn.

[21] Appl. No.: 116,122

[22] Filed: Sep. 2, 1993

[51] Int. Cl.⁶ ............................................. G01F 1/00
[52] U.S. Cl. ................................. 73/861.17; 73/861.12
[58] Field of Search ........... 73/861.12, 861.15, 861.16, 73/861.17

[56] References Cited

U.S. PATENT DOCUMENTS

| | | | |
|---|---|---|---|
| 2,685,796 | 8/1954 | Romanowski et al. | 73/194 |
| 3,290,585 | 12/1966 | McHowell | 324/34 |
| 3,299,703 | 1/1967 | Colvin et al. | 73/194 |
| 3,528,287 | 9/1970 | Melcher | 73/194 |
| 3,570,309 | 3/1971 | Birnstingl | 73/194 |
| 3,783,687 | 1/1974 | Mannherz et al. | 73/194 |
| 3,896,373 | 7/1975 | Zelby | 324/57 |
| 3,902,366 | 9/1975 | Gruner | 73/194 |
| 3,999,443 | 12/1976 | Appel et al. | 73/194 |
| 4,119,909 | 10/1978 | DeBerry | 324/30 |
| 4,290,313 | 9/1981 | Appel et al. | 73/861.17 |
| 4,408,497 | 10/1983 | Suzuki | 73/861.17 |
| 4,409,846 | 10/1983 | Ueno | 73/861.17 |
| 4,513,624 | 4/1985 | McHale et al. | 73/861.12 |
| 4,663,976 | 5/1987 | Suzuki et al. | 73/861.12 |
| 4,676,112 | 6/1987 | Uematsu et al. | 73/861.17 |
| 4,704,907 | 11/1987 | Mannherz et al. | 73/861.17 |
| 4,784,001 | 11/1988 | Gaertner et al. | 73/861.12 |
| 4,969,363 | 11/1990 | Mochizuki | 73/861.17 |

FOREIGN PATENT DOCUMENTS

| | | |
|---|---|---|
| 89302940 | of 0000 | European Pat. Off. |
| 0336615A1 | 10/1989 | European Pat. Off. |
| 0521448A2 | 7/1993 | European Pat. Off. |
| 58-047214 | 6/1983 | Japan |
| 63-032321 | 7/1988 | Japan |

*Primary Examiner*—Herbert Goldstein
*Assistant Examiner*—R. Biegel
*Attorney, Agent, or Firm*—Westman, Champlin & Kelly

[57] ABSTRACT

An electromagnetic fluid flowmeter includes empty pipe detection circuitry. The empty pipe detection circuitry applies a common mode asynchronous signal into a pair of electrodes in the flowmeter. Impedance of fluid is determined by measuring the magnitude of the asynchronous signal between an electrode and electrical ground. Impedance is used to determine an empty pipe condition.

14 Claims, 3 Drawing Sheets

MAGNETIC FLOWMETER WITH EMPTY PIPE DETECTOR

BACKGROUND OF THE INVENTION

The present invention relates to a magnetic flowmeter for measuring the flow rate of a fluid. More specifically, the invention relates to measuring fluid impedance and monitoring for an empty pipe condition in a magnetic flowmeter.

In an electromagnetic flowmeter, a pulsed magnetic flux is applied in a direction substantially perpendicular to the direction of flow of a fluid flowing through a measuring pipe. The flux induces a potential difference in the fluid varying as a function of the fluid flow rate, and the potential is sensed by two electrodes positioned in the pipe. In a flowmeter, it is useful to detect the impedance of fluid flowing through the measuring pipe. This information can be used to detect an empty pipe condition. One approach uses a DC current flowing between the electrodes and electrical ground and additional circuitry to detect the empty pipe condition, but this approach undesireably plates the electrodes so that they must be replaced. U.S. Pat. No. 4,969,363, issued Nov. 13, 1990 to Mochizuki, entitled Electromagnetic Flowmeter Capable of Simultaneous Measurement of Flow Rate and Conductivity of Fluid, discloses an empty pipe detector applying a current pulse to the electrodes to monitor fluid impedance only while the coil drive current is rising. As most flowmeters have multiple frequencies at which the coils are driven, so that the rise times of the coil drive current vary, the device must necessarily include timing circuitry which allows the device to be active for different rise times. Furthermore, some flowmeter installations have such a large cable capacitance that the fluid impedance measurement is hampered when the coil drive frequency is greater than about 35 Hz. As a result, Mochizuki's device is limited to low capacitance cabling applications, has additional timing circuitry and must be synchronized with the pulsed magnetic flux so that it cannot continuously monitor fluid conductivity.

Therefore, there is a need for a flowmeter with a continuously monitoring empty pipe detector with simple circuitry and which is independent of coil drive frequency but which does not polarize the electrodes, and operates with high capacitance cables.

SUMMARY OF THE INVENTION

The present invention is an electromagnetic flowmeter including circuitry for sensing impedance of fluid carried in a measuring pipe. The flowmeter includes means for applying pulsed magnetic flux to the measuring pipe in a direction substantially perpendicular to flow of the fluid. First and second electrodes are mounted in the flow measuring pipe and electrically contact the fluid. The flow rate is detected by measuring the potential difference between the first and second electrodes due to the applied pulsed magnetic flux. The circuitry for sensing impedance and therefor an empty pipe condition includes an AC current source, asynchronous with respect to the coil driving circuitry, applied as a common mode current to the first and second electrodes referenced to ground. A summing circuit sums the common mode currents from at least one electrode, and depending on the impedance of the electrode, which is a function of the fluid impedance and therefore indicative of an empty or full pipe condition, the common mode current is partitioned into two portions. A signal processing circuit senses a potential across a sensing impedance through which one portion of the common mode current flows. The sensed potential varies as the impedance of the fluid, and therefore indicates whether the pipe is empty or full.

In another embodiment of the invention, an AC current is applied differentially between the two electrodes at a frequency lower than the flow signal. A current divider splits the current into two portions as a function of the impedance of the fluid and filtering circuitry removes the lower frequency signal representative of the fluid impedance (and therefore indicative of an empty pipe condition) from the higher frequency flow signal.

DETAILED DESCRIPTION OF THE PREFERRED EMBODIMENTS

Figure 1:
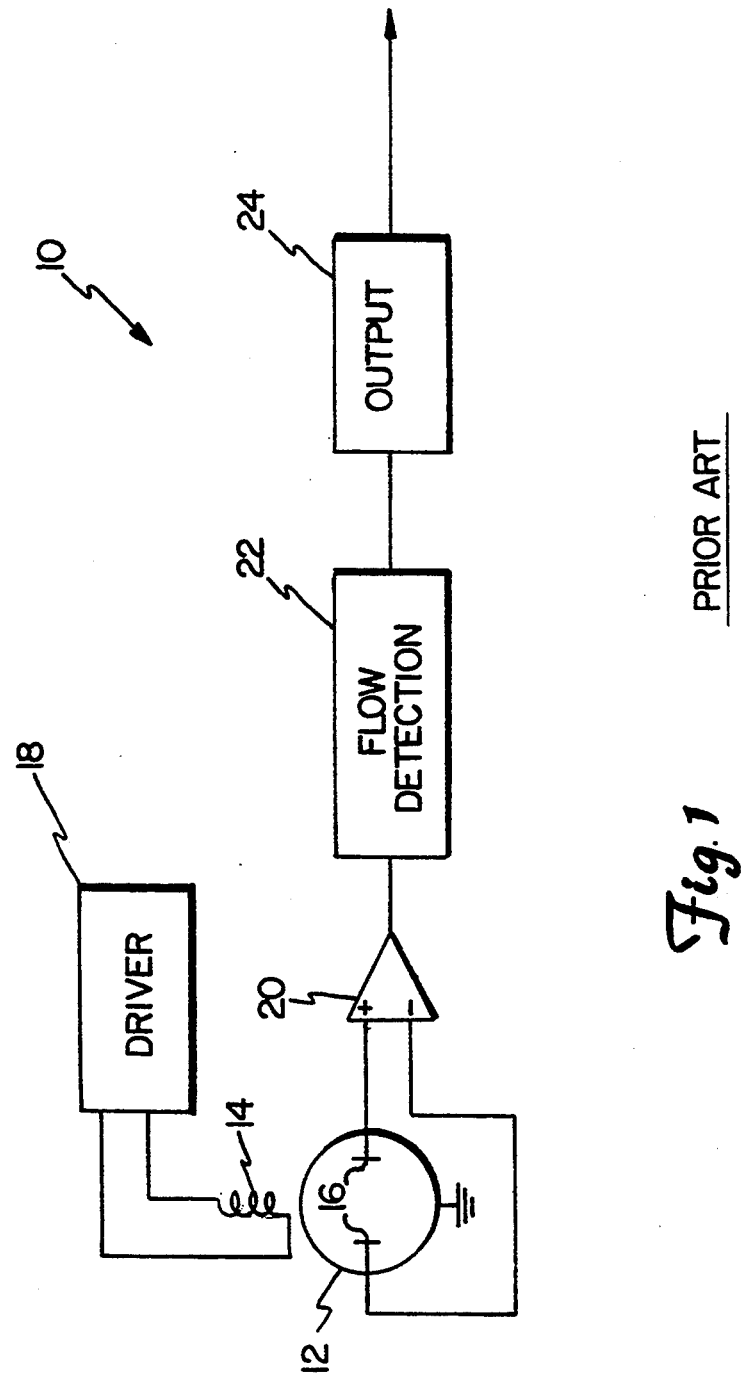
FIG. 1 is a block diagram of a prior art magnetic flowmeter.

FIG. 1 is a block diagram of prior art magnetic flowmeter 10. Prior art flowmeter 10 includes measuring pipe 12 coupled to electrical ground. Magnetic excitation coil 14 is adjacent measuring pipe 12 and a pair of electrodes 16 are carded within pipe 12. Driver circuitry 18 couples to coil 14. Differential amplifier 20 has inputs connected to the pair of electrodes 16. The output of differential amplifier 20 couples to flow detection circuitry 22 which connects to output circuitry 24.

In operation, prior art flowmeter 10 senses flow rate of a fluid flowing through measuring pipe 12. Coil 14 is excited by a pulsed excitation current generated by driver circuitry 18 and provides pulsed magnetic flux in a direction substantially perpendicular to flow of fluid through pipe 12. The magnetic flux induces a potential in the fluid and electrodes 16 have a potential difference between them. Differential amplifier 20 amplifies this potential difference and provides an amplified output to flow detection circuitry 22. Flow detection circuitry 22 calibrates the output from differential amplifier 20 to units of flow and provides an output to output circuitry 24. Output circuitry 24 provides a useful output of the flow rate information. For example, flow rate information can be transmitted over a two wire 4-20 mA process control loop.

The present invention provides circuitry which is added to the prior art flowmeter 10 of FIG. 1 to determine impedance of fluid flowing through pipe 12 without changing flow rate measurements provided by flowmeter circuitry 10.

Figure 2:
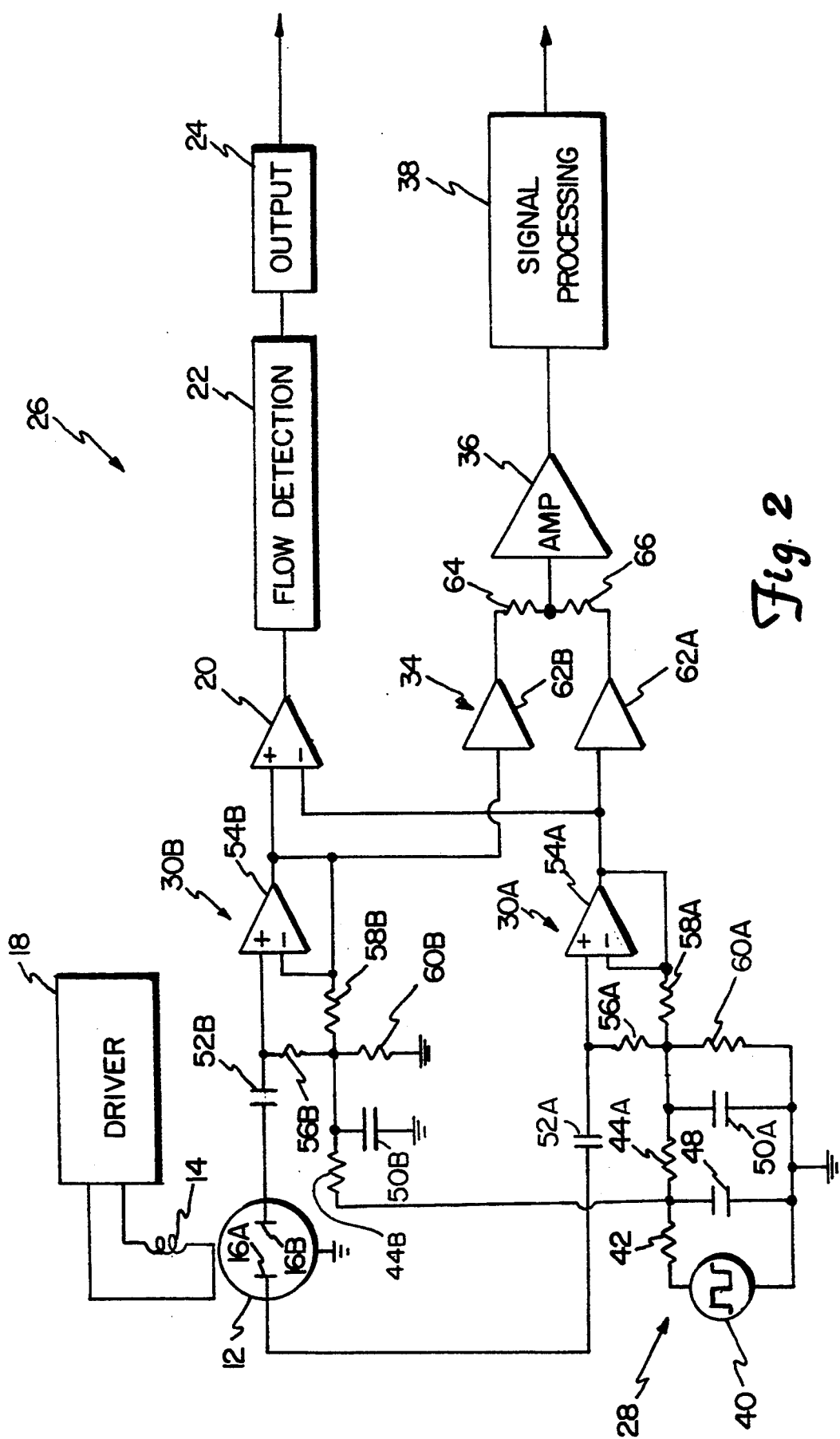
FIG. 2 is a electrical schematic diagram of a magnetic flowmeter including empty pipe detection circuitry in accordance with the present invention.

FIG. 2 is a diagram of a magnetic flowmeter 26 in accordance with the present invention. Magnetic flowmeter 26 includes some of the same circuitry of prior art flowmeter 10 used to provide a flow rate output. Magnetic flowmeter 26 includes grounded measuring pipe 12, magnetic excitation coil 14 and a pair of electrodes 16 (individually identified as electrode 16A and electrode 16B). The impedance between electrodes 16A, 16B to ground is small when the fluid covers the electrodes and significantly larger when the fluid uncovers the electrodes. Even though the conductivity of the fluid can change from installation to installation and varies over several orders of magnitude, the difference in impedance between covered and uncovered electrodes is typically a factor of 10 but may be as great as 1,000. Differential amplifier 20 amplifies the voltage difference between electrodes 16A,16B via buffer amps 30A,30B and provides an output to flow detection circuitry 22 which is connected to output circuitry 24. This circuitry operates in a manner similar to that of prior art flowmeter 10 shown in FIG. 1.

Magnetic flowmeter 26 includes oscillator 28, high input impedance amplifiers 30A,30B, summing circuitry 34, summing amplifier 36 and signal processing circuitry 38. Oscillator 28 includes square wave source 40, resistor 42, and capacitor 48. High impedance amplifier 30A is coupled to electrode 16A through blocking capacitor 52A and includes resistors 44A, 56A, 58A, 60A, capacitor 50A and operational amplifier 54A connected with negative feedback. The section of the circuit labelled with components ending with "B" is constructed the same way as the section having components ending in "A".

Outputs from operational amplifiers 54A and 54B are connected to buffer amplifiers 62A and 62B, respectively, of summing circuitry 34. Outputs from operational amplifiers 54A and 54B are also coupled to differential amplifier 20 and used to determine flow rate as described for FIG. 1. Outputs from buffer amplifiers 62A and 62B are connected together through resistors 64 and 66 and are provided to amplifier 36. The output of amplifier 36 is provided to signal processing circuitry 38.

Figure 3:
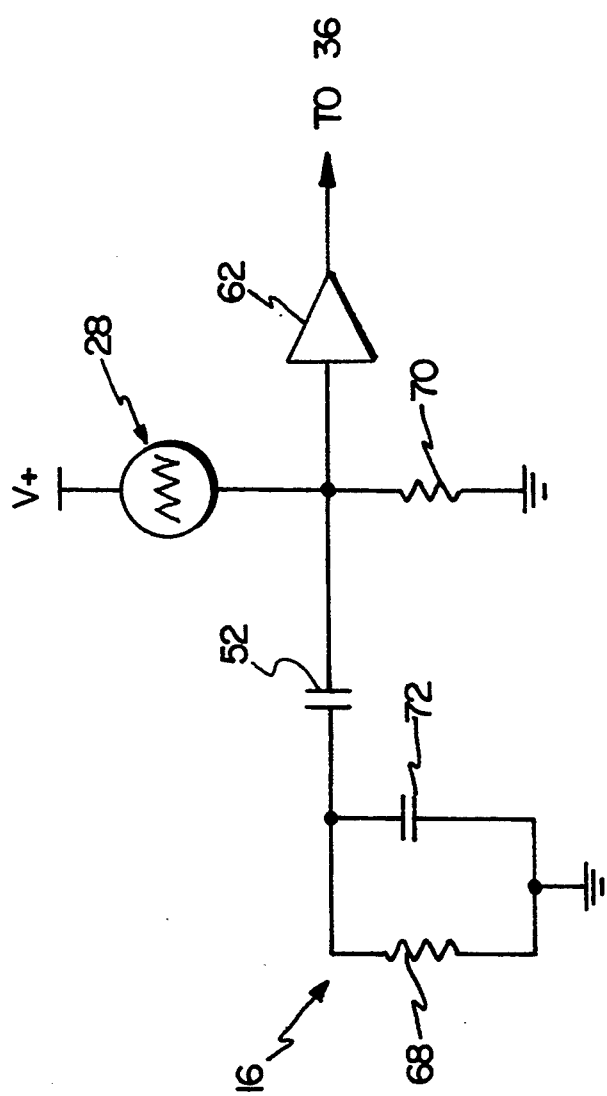
FIG. 3 is a simplified electrical schematic diagram of the empty pipe detection circuitry of the present invention.

FIG. 3 is a simplified schematic diagram of empty pipe detection circuitry in accordance with the present invention and illustrates a circuit model of the invention. FIG. 3 shows oscillator 28 and blocking capacitor 52 connected to electrode 16. The impedance of electrode 16 is modelled by resistor 68. The large input impedance of operational amplifier 54A shown in FIG. 2 is modelled as resistor 70. Capacitor 72 models the cabling capacitance used to connect electrode 16 to the flowmeter. Oscillator 28 provides a triangle wave current to the flowmeter of 2 nA peak-to-peak and at a frequency of 0.5 Hz. The frequency is independent of the coil drive frequency and selected to be lower than the lowest expected flow frequency. For this reason, the present invention is suitable for use in both AC and DC flowmeters. Typical modelled values for the circuit components are: blocking capacitor 52 is 1.0 μF, resistor 68 varies between 100 kΩ (full pipe) and 10 MΩ (empty pipe), capacitor 72 is 50 nF for a 1,000 foot cable and sense resistor 70 is $10^9$ Ω.

FIG. 3 shows the basic operation of empty pipe detection circuitry. Resistor 68, which models the fluid impedance, varies between 100 KΩ for a pipe carrying fluid above the electrode level and 10 MΩ for an empty pipe condition when the fluid level uncovers the electrodes. Since these values are much smaller than the input impedance of amplifier 54 the potential across resistor 70 at the input to amplifier 62 is highly dependent on the value of reisistor 68. Thus, the output of amplifier 62 is related to the impedance of fluid in pipe 12.

Referring back to FIG. 2, values of the components for one embodiment will be provided. Square wave source 40 is a 0.5 Hz square wave of 14 volts peak-to peak. Resistor 42 is 1.0 MΩ, capacitor 48 is 0.68 μF, resistor 44A is 10 MΩ, and capacitor 50A is 47 pF. Blocking capacitor 52A is 1.0 μF, resistor 56A is 2.2 MΩ, resistor 58A is 4.41 kΩ, and resistor 60A is 2.2 MΩ. Resistors 64 and 66 are at least 100 kΩ and have substantially the same value.

In operation, oscillator 28 generates a substantially triangularly shaped current signal of about 1 $\mu A_{PP}$ at 0.5 Hz, which is applied at the node between resistors 56A and 60A. A portion of this current flows between electrodes 16A,16B and electrical ground. This potential drop is given by:

$$KI_{PP}Z_E \tag{1}$$

where $Z_E$ is the impedance of the parallel combination of one of the electrodes (e.g. $Z_{16A}$) and its associated cable capacitance, (as modelled by $C_{72}$ in FIG. 3), in series with the input coupling capacitor, $C_{52}$ and K is the current attenuation ratio of amplifiers 54A,54B given by $$K \simeq \frac{R_{58,AB}}{R_{58A,B} + R_{60A,B}} \tag{2}$$

In the example of FIG. 3, cable capacitance is 50 nF and the sensing impedance is $10^9$ Ω. Since $R_{58A,B} << R_{60A,B}$, K can be approximated as 4.41 KΩ/2.2 MΩ, or 1/500. Thus, for an empty pipe condition where the fluid impedance, $R_{68}$, is high (10 MΩ), the potential difference is given by:

$$\left(\frac{4.4\ k\Omega}{2.2\ M\Omega}\right)(1\ \mu A)(R_{68} || Z_{C72} + Z_{C52}) \tag{3}$$

which can be substituted and simplified to:

$$8\ mV \simeq \left(\frac{4.4\ k\Omega}{2.2\ M\Omega}\right)(1\ \mu A)(4.2\ M\Omega) \tag{4}$$

For a full pipe condition where impedance $R_{68}$ is 1 MΩ, the same method of calculation predicts that the potential with respect to ground at the output of amplifiers 54A,B is approximately 2 $mV_{PP}$, a factor of 4 smaller than the potential with respect to ground when the pipe is empty. In other words the effective electrode impedance, $Z_E$, is a factor of approximately 4 larger when the pipe is empty than when it is full.

The signals at the outputs of operational amplifiers 54A,54B due to impedance of fluid in pipe 12 are common mode while the flow signal due to an induced potential between electrodes 16A and 16B is a differential signal. When the potentials with respect to ground at the outputs of amplifiers 54A and 54B are summed by amplifiers 62A,62B and resistors 64,66, the magnitude of the common mode signals are added together while the sum of the differential signals is zero. Therefore, the signal at the input to amplifier 36 is representative of the impedance of the fluid and is substantially independent of flow rate. Signal processing circuitry 38 outputs an alarm to warn an operator of the empty pipe condition if the potential with respect to ground at the output of amplifier 36 drops below a predetermined minimum threshold. Signal processing circuitry 38 also provides an output representative of the impedance of fluid in pipe 12.

Oscillator 28 generates an AC signal to prevent electrode polarization. In one embodiment, signal source 40 is a microprocessor used to operate flowmeter 26, and signal processing circuitry 38 samples the output of amplifier 36 during a maximum in the triangle wave. Such timing of the sampling reduces the effects of noise and also samples the in-phase component of the potential with respect to ground, so as to use the real part of the impedance.

Although the present invention has been described with reference to preferred embodiments, workers skilled in the art will recognize that changes may be made in form and detail without departing from the spirit and scope of the invention. For example, fluid impedance can be measured differentially between the two electrodes. In this case, an AC signal is applied to one electrode and the output at the other electrode is measured. The frequency of the applied signal is different from the flow signal and can be filtered from the flow signal.

What is claimed is:

1. A flowmeter, comprising:
   a flow pipe connected to electrical ground;
   a magnetic coil adjacent the flow pipe and oriented to provide magnetic flux in a direction perpendicular to the flow of a fluid through the flow pipe;
   drive circuitry coupled to the magnetic coil to energize the coil;
   a pair of electrodes inside the pipe, the impedance of the electrodes to ground indicative of whether the fluid covers the electrodes;
   means for producing a flow rate output as a function of a potential difference between the electrodes due to the magnetic flux; and
   a signal source operably coupled to at least one of the electrodes and to a large impedance element, the source asynchronous with respect to the energization of the magnetic coil, where the signal is applied to the large impedance element and the electrode impedance to ground so that a potential across the large impedance element indicates whether the fluid covers the electrodes.

2. The flowmeter of claim 1 where the signal source comprises means for generating a triangle wave.

3. The flowmeter of claim 1 where an amplifier amplifies the potential difference across the large impedance element and provides an output related to an empty pipe condition.

4. The flowmeter of claim 3 where the amplifier comprises an operational amplifier connected with negative feedback to increase input impedance and having a positive input connected to an electrode.

5. The flowmeter of claim 1 including a DC blocking capacitor connected between the large impedance element and one of the electrodes.

6. The flowmeter of claim 1 further comprising signal processing means for providing an output indicative of an empty pipe condition as a function of the potential across the large impedance element.

7. A flowmeter, comprising:
   a pipe coupled to electrical ground and adapted to carry a fluid flowing through the pipe;
   coil means for applying a pulsed magnetic flux in a direction substantially perpendicular to a direction of fluid flow;
   a first electrode and a second electrode mounted in the pipe, where the first and second electrodes detect an induced potential generated in the fluid due to the pulsed magnetic flux, the impedance of the electrodes to ground varying as a function of the impedance of the fluid;
   flow rate means for producing a flow rate output as a function of the potential difference between the electrodes, where the flow signal is a differential signal between the first and second electrodes; and
   a current source providing a current which flows through at least one of the electrodes and through a large impedance element, so that the potential difference across the large impedance element is a function of the fluid impedance, wherein the current source is asynchronous with the pulsed magnetic flux provided by the coil means.

8. The flowmeter of claim 7 where the current source is asynchronous with respect to the coil energization and generates a triangle wave.

9. The flowmeter of claim 7 further comprising an amplifier with large input impedance which senses the potential across the large impedance element.

10. The flowmeter of claim 9 where the amplifier comprises an operational amplifier connected with negative feedback to increase input impedance and having a positive input connected to the electrode.

11. The flowmeter of claim 7 including a DC blocking capacitor connected between the large impedance element and the electrode.

12. The flowmeter of claim 7 including signal processing means coupled to the large impedance element sensing potential across the large impedance element and responsively for providing an output indicating an empty pipe condition as a function of the potential difference across the large impedance element.

13. A flowmeter, comprising:
   a pipe coupled to electrical ground and adapted to carry a fluid flowing through the pipe;
   coil means for applying a pulsed magnetic flux in a direction substantially perpendicular to a direction of fluid flow;
   a first electrode and a second electrode mounted in the pipe, where the first and second electrodes detect an induced potential generated in the fluid due to the pulsed magnetic flux, the impedance of the electrodes to ground varying as a function of the impedance of the fluid;
   flow rate means for producing a flow rate output as a function of the potential difference between the electrodes, where the flow signal is a differential signal between the first and second electrodes; and
   means for applying a current asynchronous to the pulsed magnetic flux to at least one of the electrodes and a large impedance element, where the magnitude of current in the large impedance element is representative of the fluid impedance, wherein the current source is asynchronous with the pulsed magnetic flow provided by the coil means.

14. A flowmeter coupled to a pipe through which a fluid flows, the flowmeter providing a flow output as a function of the rate of fluid flow, the flowmeter having a coil energized to provide a magnetic flux which induces a potential field within the fluid and having a pair of electrodes coupled to the fluid for sensing a potential difference varying as a function of the flow rate, where the improvement comprises:

an asynchronous AC current source coupled to at least one of the electrodes and to a large impedance element, the electrodes having an impedance varying with the level of fluid in the pipe, which provides a current to the large impedance element and the electrode impedance so that the potential difference across the large impedance element is representative of the fluid impedance; and comparison means coupled to the large impedance element for comparing the potential difference across the large impedance element to a reference potential and providing an output indicating an empty pipe condition when the sensed potential is less than the reference potential.

* * * * *

UNITED STATES PATENT AND TRADEMARK OFFICE
CERTIFICATE OF CORRECTION

PATENT NO. : 5,426,984
DATED : June 27, 1995
INVENTOR(S) : Bruce D. Rovner, Thomas P. Coursolle It is certified that error appears in the above-indentified patent and that said Letters Patent is hereby corrected as shown below:

Col. 2, line 34, please delete "carded" and insert --carried--.

Signed and Sealed this

Twenty-third Day of January, 1996

Attest:

BRUCE LEHMAN

Attesting Officer          Commissioner of Patents and Trademarks